United States Patent [19]
Oguri et al.

[11] Patent Number: 5,685,525
[45] Date of Patent: Nov. 11, 1997

[54] CARBON FIBER REINFORCED RESIN COIL SPRING

[75] Inventors: Takeshi Oguri; Masanobu Wakita; Masahito Yamauchi, all of Shizuoka-ken; Toshio Hisano, Gyoda; Yoshiyuki Takezawa, Gyoda; Masahiro Arai, Gyoda, all of Japan

[73] Assignees: Toho Rayon Co., Ltd., Tokyo; Showa Corporation, Gyoda, both of Japan

[21] Appl. No.: 284,136

[22] Filed: Aug. 2, 1994

[30] Foreign Application Priority Data

Aug. 4, 1993 [JP] Japan .................................. 5-212368

[51] Int. Cl.⁶ .................................. F16F 1/36; B29C 67/14
[52] U.S. Cl. .................................. 267/148; 267/166
[58] Field of Search .................................. 267/148, 149, 267/166; 156/169, 175, 180, 257; 264/281

[56] References Cited

U.S. PATENT DOCUMENTS 4,380,483   4/1983   Kliger .................................. 156/169

FOREIGN PATENT DOCUMENTS

| 2 602 461 | 2/1988 | France . | |
| 35 06 037 | 1/1986 | Germany . | |
| 0215135 | 9/1987 | Japan | 267/148 |
| 2 041 152 | 9/1980 | United Kingdom . | |
| 2 056 615 | 3/1981 | United Kingdom . | |
| 8500207 | 1/1985 | WIPO | 267/148 |

OTHER PUBLICATIONS

Patent Abstracts of Japan, vol. 14, No. 33(M–923) (3976) Jan. 22, 1990, 1–269736(A), Mitsubishi Heavy Ind Ltd.
Patent Abstracts of Japan, vol. 9, No. 172(M–397) (1895) Jul. 17,1985, 60–44627 (A), Mitsubishi Rayon K.K.

*Primary Examiner*—Robert J. Oberleitner
*Assistant Examiner*—Chris Schwartz
*Attorney, Agent, or Firm*—Kanesaka & Takeuchi

[57] ABSTRACT

In a carbon fiber reinforced resin coil spring the carbon fibers A,B are oriented at an angle of ±30~±60° relative to the axis of the cord of the spring. Further, the ratio A/B of the amount of the fibers A oriented in the compression direction and the fibers B oriented in the tension direction lies within the range of;

$$1.1 < A/B < 4.0$$

4 Claims, 5 Drawing Sheets

Fig. 9

| | Compression coil spring | | | | | | Tension coil spring | |
|---|---|---|---|---|---|---|---|---|
| Example No. | 1 | 2 | 3 | | | 4 | 5 | 6 | |
| Comparative Example No. | | | | 1 | 2 | 3 | | | 4 |
| Amount ratio of fibers (A/B) | 1.39 | 1.67 | 2.0 | 0.5 | 1.0 | 0 | 1.67 | 1.33 | 1.39 | 1.0 |
| Angle of fibers | ±45 | ±45 | ±45 | ±45 | ±45 | ±45 | ±45 | ±45 | ±45 | ±45 |
| Amended shearing strength (Kgf/mm$^2$) | 57 (559.17 N/mm$^2$) | 52 (510.12 N/mm$^2$) | 45 (441.45 N/mm$^2$) | 38 (372.78 N/mm$^2$) | 39 (382.59 N/mm$^2$) | 18 (176.58 N/mm$^2$) | 53 (519.93 N/mm$^2$) | 56 (549.36 N/mm$^2$) | 43 (421.83 N/mm$^2$) | 31 (304.11 N/mm$^2$) |

CARBON FIBER REINFORCED RESIN COIL SPRING

BACKGROUND OF THE INVENTION

1. Field of the Invention

This invention relates to a carbon fiber reinforced resin coil spring and more specifically to a coil spring consisting of a spirally wound cord made of carbon fiber reinforced resin.

2. Description of the Related Art

U.S. Pat. No. 2,852,424 proposes a fiber reinforced resin coil spring which is more lightweight than a conventional metal coil spring. The coil spring is made of resin impregnated glass roving which is wound on a mandrel for forming a coiled structure. In this resin coil spring, the orientation of the reinforced fibers is uniform and is parallel to the axis of the cord.

Japanese Patent Laid Open No. 56-18136 discloses a coil spring in which the orientation of the fibers is chosen relative to the axis of the cord. Namely, all the reinforcing fibers are oriented with respect to the direction in which the fibers are subject to a tensile force when a load is applied to the coil spring. The orientation angle is within the range of 30°~60° relative to the axis of the cord.

Japanese Patent Laid Open No. 57-11742 discloses a coil spring in which the reinforcing fibers are inclined at a predetermined oblique angle with respect to the axis of the cord. Further, the reinforcing fibers are wound in the two different directions so that the two groups of fibers cross over each other, the cross-over angle at the center in the longitudinal direction being different from the angles at both ends. Such an arrangement of the reinforced fibers allows regulation of torsional rigidity and gives the coil spring a non-linear spring constant.

Generally, the carbon fiber is a material having excellent mechanical properties, and carbon fiber reinforced resins have excellent features. However, the carbon fiber reinforced resin also has the disadvantage of relatively low compressive strength compared with tensile strength.

When weight or force is applied to the coil spring having oblique reinforcing fibers with respect to the axis of the cord which are wound in two different directions and which cross each other, the cord receives a torsional stress. This torsional stress causes a compressive force to act on the first group of oriented fibers and a tensile force to act on the second group of oriented fibers. Due to this characteristic of the carbon fiber reinforced resin composites, the fracture of the coil spring begins in the layer in which the reinforcing fibers are oriented in the direction of compression. In the above-mentioned coil spring disclosed in Japanese Patent Laid Open No. 56-18136, substantially all the reinforcing fibers are oriented in the same direction. In this kind of coil spring, the strength of the spring in the direction at 90° relative to the direction of the oriented fibers is low, so the spring is easily destroyed.

On the other hand, the coil spring shown in Japanese Patent Laid Open No. 57-11742 has two groups of reinforcing fibers, having different orientations which cross over each other. With this arrangement, the problem of the spring's weakness in the direction at 90° relative to the orientation of the fibers, is solved. However, the defect such that the carbon fiber reinforced resin has a low compressive strength is left unsolved.

This invention is based on the knowledge that the fracture of the coil spring made of carbon fiber reinforced resin begins in the fibers oriented in the same direction as that of the applied compression, and on the theory that the overall strength of the coil spring increases when the fracture of the fibers in the direction of the compression is controlled.

OBJECTS AND SUMMARY OF THE INVENTION

It is an object of this invention to solve the above mentioned problem due to the inherent characteristics of a carbon fiber reinforced composite material, and to provide a high strength carbon fiber reinforced resin coil spring having a desirable balance between compressive strength and tensile strength.

Another object of this invention is to provide a carbon fiber reinforced resin coil spring wherein the ratio A/B of the amount of fibers oriented in the direction the compressive force is applied and the amount of fibers oriented in the direction the tensile force is applied, is adjusted to be within a desirable range.

A further object of this invention is to provide a method for manufacturing a carbon fiber reinforced resin coil spring having a desirable balance between compressive strength and tensile strength.

A still further object of this invention is to provide a method for manufacturing a carbon fiber reinforced resin coil spring in which the ratio A/B of the amount of fibers oriented in the direction the compressive force is applied and the amount of fibers oriented in the direction the tensile force is applied, is adjusted to be within a predetermined range.

According to one embodiment of this invention, there is provided a carbon fiber reinforced resin coil spring consisting of a spirally wound cord which is made from carbon fiber reinforced resin;

wherein the carbon fibers are orientated at an angle of ±30~±60° relative to the axis of the cord; and the ratio of the amounts of the carbon fibers A and B lies within the range $$1.1 < A/B < 4.0$$

where A is the amount of carbon fibers oriented in the direction the compressive force is applied and B is the amount of carbon fibers oriented in the direction the tensile force is applied.

According to the carbon fiber reinforced resin coil spring of another embodiment of this invention, a carbon fiber fabric is arranged as the outermost layer of the cord.

According to the carbon fiber reinforced resin coil spring of this invention, the compressive force is caused by the carbon fibers oriented in the compression direction which prevents the fracture of the spring in the direction the compressive force is applied. Hence, a coil spring having high shearing strength is obtained.

In the context of this invention, the orientation of the fibers is defined by the angle between the axis of the cord and the fiber axis. In this specification, the direction wherein the tensile force is applied in the cord is assumed to be the plus (+) direction, and the direction the compressive force is applied is assumed to be the minus (−) direction.

The carbon fibers utilized as the reinforcing material may be any ordinary carbon fibers such as polyacrylnitril (PAN) based carbn fibers, pitch based carbon fibers, and rayon based carbon fibers. From the viewpoint of compressive strength, PAN based carbon fibers are preferred. High strength PAN based carbon fibers are especially preferred because of their high compressive strength.

This invention does not prohibit the use of other fibers in conjunction with the carbon fiber, for example, glass fiber, aramid fiber or highly extensible fiber, in the shape of a filament, unwoven fabric, or woven fabric in accordance with the purpose to which the coil spring may be put.

In this invention, the matrix resin reinforced by the carbon fiber may be a thermosetting resin or a thermoplastic resin. Examples of thermosetting resins are epoxy resin, polyimide resin, and unsaturated polyester resin; examples of thermoplastic resins are polysulfonic resin, polyethersulfonic resin, polycarbonate resin, polyetherketone resin, polyetheretherketone resin, aromatic polyamide resin, polyetherimide resin, and thermoplastic polyimide resin.

A suitable combination of the reinforcing fiber and the matrix resin is selected from the above-mentioned materials. The fiber and the resin arranged in the plus direction may both be the same as or different from the fiber and the resin arranged in the minus direction. The orientation of the fibers may be adjusted within the range of ±30°~±60° in accordance with the required characteristics of the coil spring. The angle should be selected to be in the vicinity of ±45° when high shearing strength is required.

The shape and the form of the materials are not limited. A prepreg may be used in the form of a sheet, tape or strand of reinforcing fiber previously impregnated with uncured thermosetting resin. The so-called filament winding method may also be utilized wherein a filament is wound on a mandrel while it is impregnated with the resin.

A preferred example of this invention will now be described with reference to the drawings. FIG. 1 and FIG. 2 show carbon fiber reinforced resin coil springs which are respectively subject to a compressive force and a tensile force. FIG. 3 and FIG. 4 show enlarged partial fragments of the strand whereof a coil springs 10 shown in FIG. 1 and FIG. 2 are formed. The compressive stress acts on the fibers oriented in the direction denoted by A, and the tensile stress acts on the fibers oriented in the direction denoted by B, when the coil spring is subject to a compressive force as shown by FIG. 1 and FIG. 3. On the other hand, the compressive stress acts on the fibers oriented in the direction denoted by A, and the tensile stress acts on the fibers oriented in the direction denoted by B, when the coil spring is subject to a tensile force as shown by FIG. 2 and FIG. 4. Namely, for the purpose of the spring, i.e. compressing or tensioning, the structure of the spring is different.

According to this invention, the following relationship is satisfied between the amount A of fibers upon which the compressive stress acts and the amount B of fibers upon which the tensile stress acts.

$$1.1 < A/B < 4.0$$

A more preferred range for the ratio A/B between the amount A of the fibers subject to a compressive force and the amount B of the fibers subject to a tensile force is $$1.2 < A/B < 3.0$$

and a still more preferred range for the ratio A/B is:

$$1.3 < A/B < 2.5$$

When the ratio of the amounts A/B is less than 1.1 or $1.1 \geq A/B$, the strength of the spring in the direction the compressive force applies becomes low, and the equilibrium in the direction the tensile force applies will be upset, so that a high strength coil spring cannot be obtained. When the ratio of the amounts A/B is more than 4.0 or $A/B \geq 4.0$, the strength of the spring in the direction the tensile force applies becomes low, and the equilibrium in the direction the compressive force applies will be upset, so that in this case also, a high strength coil spring cannot be obtained.

The adjustment of the ratio A/B of the amounts of fibers in two different directions is performed when the fibers are overlaid. When the cord is made from a prepreg, a prepreg in the plus direction and a prepreg in minus direction are used, and the weight of fibers in the former is varied from that in the latter to perform the adjustment. Alternatively, as shown in FIG. 5, two kinds of prepregs 15, 16, each containing an equal weight of fibers, are used, and the number of the prepregs 15 in the plus direction is varied from the number of the prepregs 16 in the minus direction to perform the adjustment. A carbon fiber fabric 17 is formed at the outermost layer. Still further, the above-mentioned two methods may be combined for the adjustment of the amount ratio A/B.

When the cord is manufactured by the filament wind method, the fibers are first wound on the mandrel in the positive direction, and then the mandrel is driven in the opposite direction for winding the fibers in the negative direction. In these processes, the amounts of the fibers in the two directions are regulated so that the ratio of the amounts of fibers in these directions lies within the predetermined range.

A preferred process according to this invention for manufacturing the fiber reinforced resin coil spring is as follows. As shown in FIG. 5, two kinds of prepregs 15, 16 made of reinforcing carbon fibers and a thermosetting resin, and each containing equal weights of fibers, are prepared. The number of sheets of the above-mentioned two kinds of prepregs 15, 16 is regulated, and the prepregs 15, 16 are wound on a flexible mandrel 18 as shown in FIG. 6. By this process, a cylindrical cord 20 is obtained. The cord 20 is then wound on a spiral groove 23 formed on the peripheral surface of a columnar die 22 as shown in FIG. 7, the cord 20 is fixed, and the resin is cured by heat. The cord is then removed from the die so as to obtain the coil spring 10 as shown in FIG. 8.

A flexible mandrel is used as shown in FIG. 6. Suitable materials for the mandrel are Nylon, silicone resin, Teflon and polymethylpentene. From the viewpoint of handling properties and thermal stability, polymethylpentene is preferred. As these materials are lighter than metals, it is not necessary to form a hollow to decrease weight, and it is therefore possible to use a cord 20 wherein the mandrel 18 has been left inside. A coil spring made of such solid cords has high buckling strength.

To improve the impact resistance characteristics of the surface of the coil spring 10, and to improve its molding properties and surface design, the outermost layer of the material may be made of fabric prepreg.

The above and other objects, features and advantages of the invention will be apparent from the following description of illustrative examples, which are to be read in connection with the accompanying drawings.

BRIEF DESCRIPTION OF THE DRAWINGS

FIG. 9 is a Table for showing shearing strength of the examples and comparative examples.

DETAILED DESCRIPTION OF THE PREFERRED EMBODIMENTS

EXAMPLE 1

Figure 1:
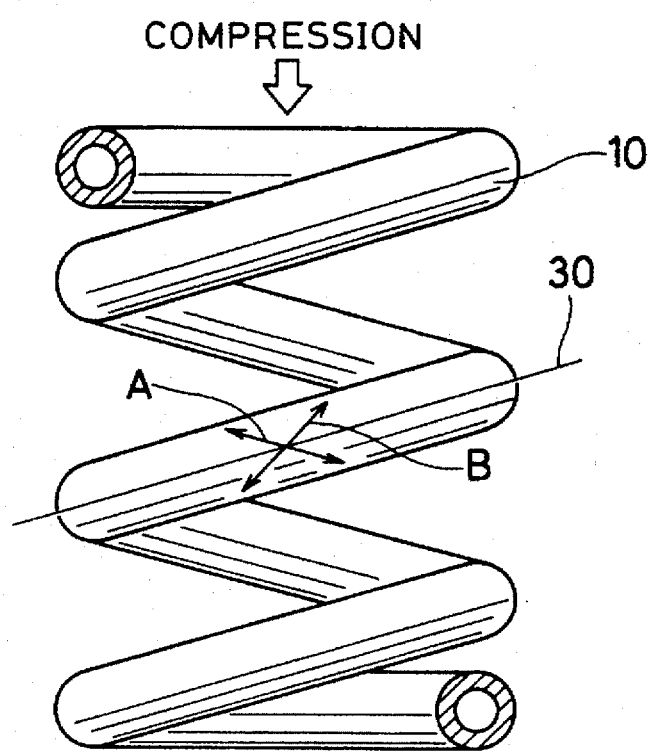
FIG. 1 is a partial front view of a coil spring subject to a compressive force.
Figure 2:
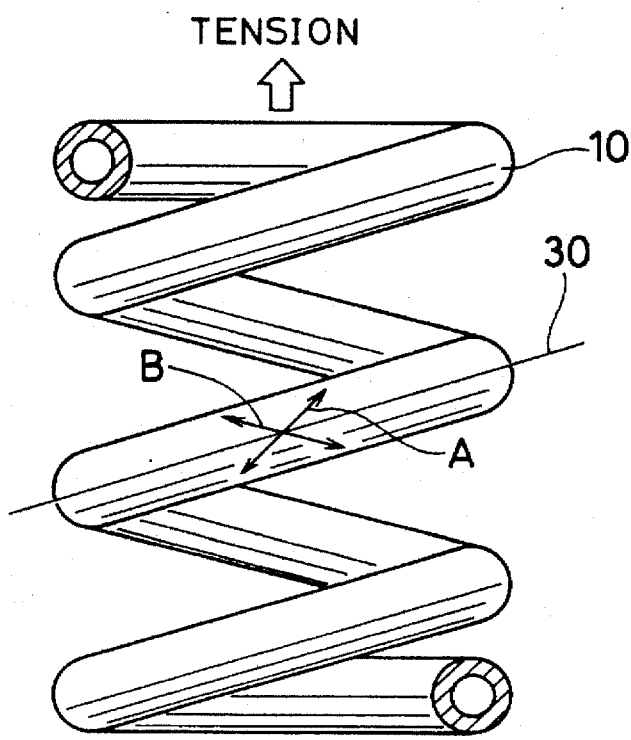
FIG. 2 is a partial front view of a coil spring subject to a tensile force.
Figure 3:
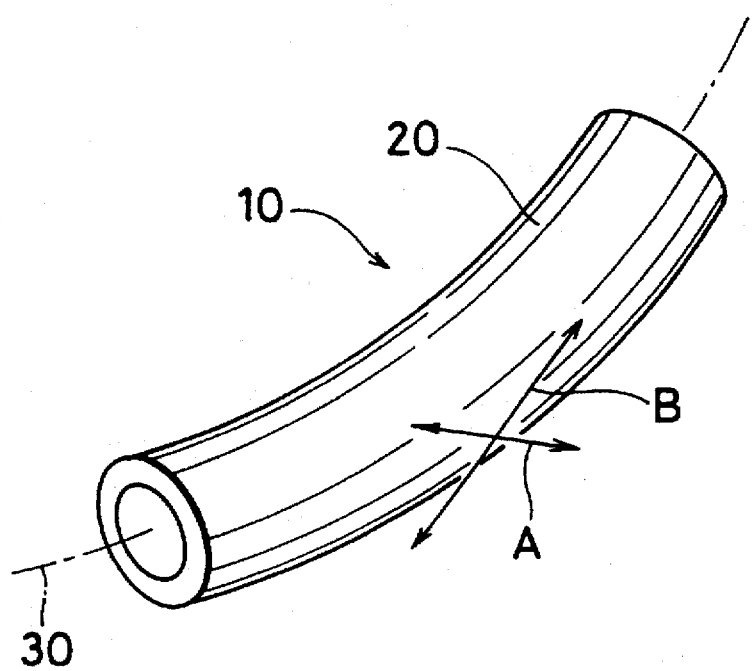
FIG. 3 is a partially enlarged perspective view of a cord of the coil spring subject to a compressive force.
Figure 4:
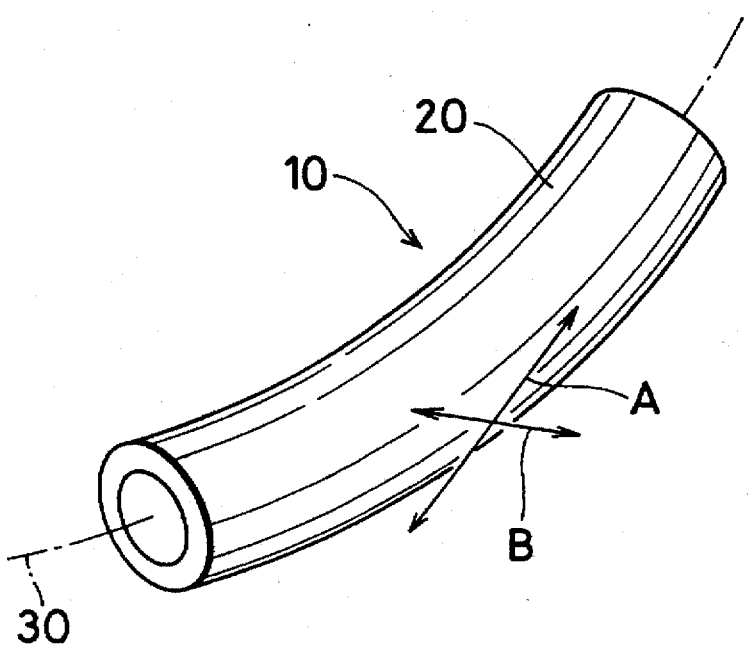
FIG. 4 is a partially enlarged perspective view of a cord of the coil spring subject to a tensile force.
Figure 5:
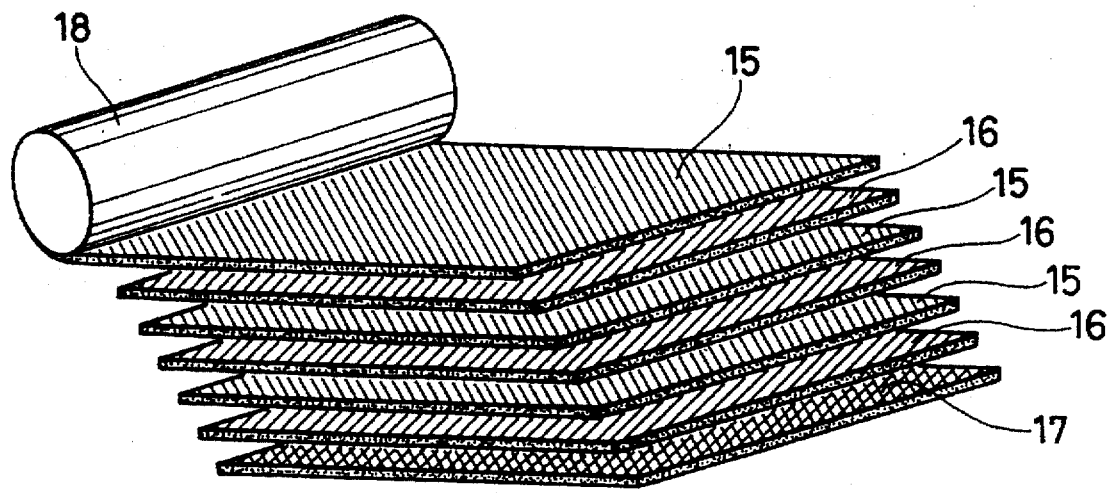
FIG. 5 is an exploded perspective view of a prepreg for the cord.
Figure 6:
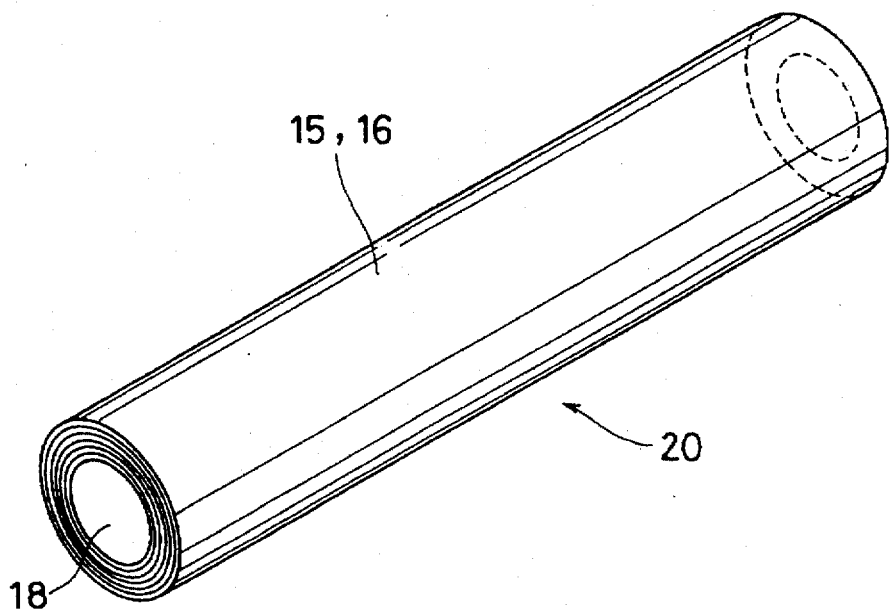
FIG. 6 is an enlarged cross section of a cord made from a prepreg wound on a mandrel.
Figure 7:
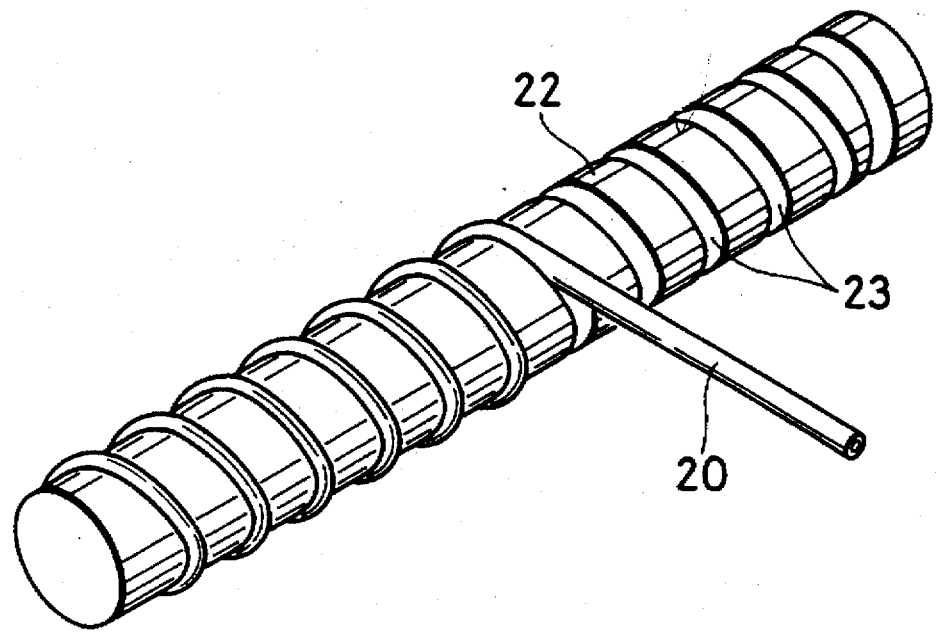
FIG. 7 is a perspective view of a die on the spiral groove of which the cord is wound.
Figure 8:
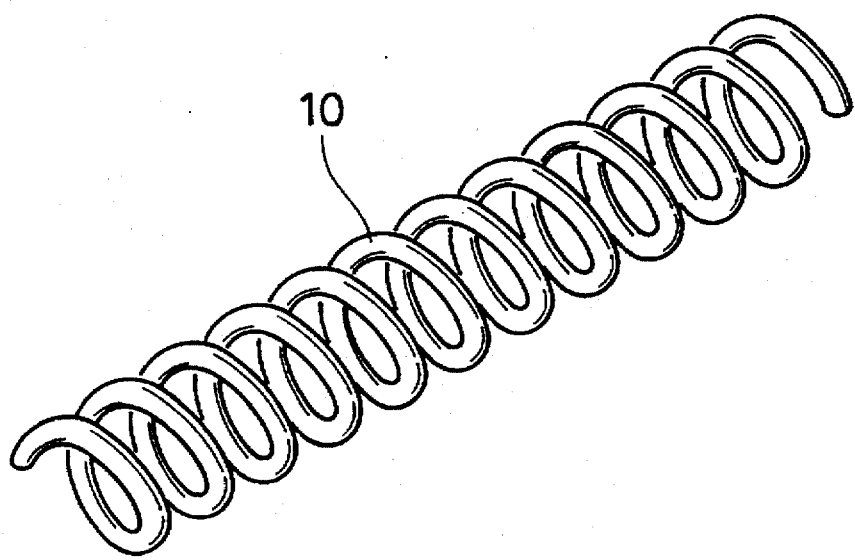
FIG. 8 is a perspective view of a manufactured coil spring.

Carbon fiber/epoxy resin prepregs (manufactured by Toho Rayon Co. Ltd.) in which all the carbon fibers are uniformly orientated in one direction were prepared. A prepreg sheet was then obtained by laminating the prepregs so that the carbon fibers of the first group of prepregs and those of the second group of prepregs crossed each other at an angle of ±45°, and the amount ratio A/B of the minus direction fibers and the plus direction fibers was 1.39. A flexible mandrel, whereof the diameter was 8 mm and the length was 1000 mm, and which was made of polymethylpentene resin, was prepared. The above-mentioned prepreg sheet was wound on the mandrel in such a manner that the side edge of the sheet was parallel to the axis of the mandrel and the directions of the fibers of the prepregs were ±45°. A cord of diameter 17 mm was thereby obtained.

The cord was wrapped by polyester tape and fixed on the spiral groove of the die. The cord was then heated, first for 30 minutes at a temperature of 80° C. and then for 2 hours at a temperature of 130° C. The resin of the cord was thereby compressed by the shrinkage of the tape, and the resin was cured. The cured resin coil spring was then taken out of the groove of the die.

By this process, a coil spring was obtained whereof the strand diameter was 16 mm, the mean diameter of spring was is 75 mm, the free height was 120 mm, the number of effective winding turns was 2.5, and the amount ratio A/B was 1.39.

A jig was fitted on the top of the coil spring for the purpose of carrying out a compressive test using an Instron type testing machine. In the test, a load was applied to the center axis of the coil spring. The result of the test shows that the corrected shearing strength was 57 kgf/mm$^2$ (Kilogram-force/mm$^2$), i.e. 559.17N/mm$^2$.

EXAMPLE 2

The amount ratio A/B of the fibers in the plus and minus direction was changed to 1.67 as shown in FIG. 9. The other conditions were the same as those of the first example. A coil spring was manufactured for the compressive test in the same manner as that of Example 1. According to the test results, the corrected shearing strength of the coil spring of this example was found to be 52 kgf/mm$^2$ (510.12N/mm$^2$).

EXAMPLE 3

The amount ratio A/B of the fibers in the plus and minus directions was changed to 2.0. The other conditions were the same as those of the first example. A coil spring was manufactured for the compressive test in the same manner as that of Example 1. The resulting corrected shearing strength was 45 kgf/mm$^2$ (441.45N/mm$^2$).

Comparative Example 1

The amount ratio A/B of the fibers in the plus and minus directions was set at 0.5. The other conditions were the same as those of Example 1. A coil spring was manufactured for the compressive test which was performed in the same manner as that of Example 1. According to the results of the compressive test, the corrected shearing strength was 38 kgf/mm$^2$ (372.78N/mm$^2$). This value is rather low in comparison to the values of Examples 1~3.

Comparative Example 2

The amount ratio A/B of the fibers in the plus and minus directions was set at 1.0. The other conditions were the same as those of Example 1. A coil spring was manufactured and tested for compression in the same manner as that of the first example.

According to the test results, the corrected shearing strength was 39 kgf/mm$^2$ (382.59N/mm$^2$) as shown in FIG. 9. This value is substantially the same as that of comparative Example 1.

Comparative Example 3

All the carbon fibers were uniformly oriented only in the plus direction at an angle of 45°, the amount ratio A/B of the fibers in the plus and minus directions being 0. A coil spring was manufactured in the same manner, the other conditions being the same as those of the first example. This coil spring was subjected to a compressive test as in the first example The result of the test showed that the corrected shearing strength was 18 kgf/mm$^2$ (176.58N/mm$^2$), which is a very low value.

EXAMPLE 4

A bundle of high strength carbon fibers (Besfight, manufactured by Toho Rayon Co. Ltd.) was impregnated with bisphenol-A type epoxy resin containing hardener. The resin-impregnated bundle of carbon fibers was laminated or wound on a mandrel by the filament winding method in such a manner that the amount ratio A/B of the fibers in the plus and minus directions was 1.67, and the directions of the two groups of fibers was ±45° relative to the axis of the mandrel. A cord was thereby manufactured. This cord was molded by the same process as that used in the first example. The coil spring so manufactured was then subjected to a compressive test as in the first example. The result of the test showed that the corrected shearing strength of the spring was 53 kgf/mm$^2$ (519.93N/mm$^2$).

EXAMPLE 5

A carbon fiber/epoxy resin prepreg (manufactured by Toho Rayon Co. Ltd.) in which all the carbon fibers were uniformly oriented in one direction, was used. A plurality of prepregs were laminated on each other in such a manner that the amount ratio A/B of the fibers in the plus and minus directions was 1.39, and the directions of the two groups of fibers was ±45°.

The laminated sheet was wound on a mandrel in such a manner that the side edge of the sheet was parallel to the axis of the mandrel, and the directions of the reinforcing fibers were ±45° relative to the axis of the resulting cords. Another plain woven prepreg (manufactured by Toho Rayon Co. Ltd.) was wound on the outer surface so that the angles of the fibers were ±45°. In this way, a cord was obtained which was molded by the same process as that of the first example, resulting in a coil spring wherein the amount ratio A/B was 1.33.

This coil spring had a smooth surface and novel design because of its outermost prepreg of fabric. The shearing strength of the coil spring was 56 kgf/mm$^2$ (549.36N/mm$^2$), which is a relatively high value.

EXAMPLE 6

A coil spring, wherein the amount ratio A/B was 1.39 and the shape and dimensions were the same as those of the coil spring of the first example, was manufactured. The coil spring was then subjected to a tensile test wherein a tensile force was applied to the coil spring. The corrected shearing strength was 43 kgf/mm$_2$ (421.83N/mm$^2$).

Comparative Example 4

The amount ratio A/B was set at 1.0, the other conditions being the same as those of the first example. A tension coil spring was thereby manufactured. This coil spring was subjected to a tensile test. The result of the test showed that the corrected shearing strength was 31 kgf/mm$^2$ (304.11N/mm$^2$).

What is claimed is:

1. A carbon fiber reinforced resin coil spring comprising, a spirally wound cord formed of a resin and carbon fibers A and B disposed in the resin, said carbon fibers A and B being oriented at an angle of ±30°–±60° relative to an axial direction of the cord, said carbon fibers A being oriented in a direction that compressive force is applied and said carbon fibers B being oriented in a direction that tensile force is applied, the ratio of amounts of carbon fibers A and B being 1.1<A/B<4.0 to thereby provide high shearing strength.

2. A carbon fiber reinforced resin coil spring according to claim 1, wherein said carbon fibers A and B are generally oriented perpendicularly to each other.

3. A carbon fiber reinforced resin coil spring according to claim 2, wherein said carbon fibers A and B are laminated alternately with respect to each other.

4. A carbon fiber reinforced resin coil spring according to claim 1, wherein said cord further includes a carbon fiber fabric arranged at an outermost layer thereof.

* * * * *